United States Patent
Schmid et al.

(10) Patent No.: US 8,532,836 B2
(45) Date of Patent: Sep. 10, 2013

(54) DEMAND RESPONSE LOAD REDUCTION ESTIMATION

(75) Inventors: James Joseph Schmid, Acworth, GA (US); Ninad Vijaykumar Kulkarni, Atlanta, GA (US); Jerry Steven Massey, Atlanta, GA (US); Chad Eric Knodle, Atlanta, GA (US); Bobby Antione Wilson, Atlanta, GA (US); Mark Joseph Meyerhofer, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 265 days.

(21) Appl. No.: 12/941,462

(22) Filed: Nov. 8, 2010

(65) Prior Publication Data

US 2012/0116600 A1     May 10, 2012

(51) Int. Cl.
- *G06F 19/00* (2011.01)
- *G06Q 50/06* (2012.01)
- *H02J 3/14* (2006.01)
- *H02J 3/00* (2006.01)

(52) U.S. Cl.
CPC .............. *G06F 19/00* (2013.01); *G06Q 50/06* (2013.01); *H02J 3/14* (2013.01); *Y02B 70/3225* (2013.01); *Y04S 20/222* (2013.01); *H02J 3/008* (2013.01)
USPC .......................................... 700/291; 713/300

(58) Field of Classification Search
USPC ................................. 700/291, 286, 295–297
See application file for complete search history.

(56) References Cited

U.S. PATENT DOCUMENTS

| | | | |
|---|---|---|---|
| 5,436,510 A | 7/1995 | Gilbert | |
| 7,130,719 B2 | 10/2006 | Ehlers et al. | |
| 7,177,728 B2 * | 2/2007 | Gardner | 700/295 |
| 7,343,226 B2 | 3/2008 | Ehlers et al. | |
| 7,349,765 B2 | 3/2008 | Reaume et al. | |
| 7,379,997 B2 * | 5/2008 | Ehlers et al. | 709/224 |
| 7,561,977 B2 | 7/2009 | Horst et al. | |
| 7,606,719 B2 | 10/2009 | Barsness et al. | |
| 2004/0133314 A1 | 7/2004 | Ehlers et al. | |
| 2005/0143865 A1 * | 6/2005 | Gardner | 700/291 |
| 2008/0177423 A1 * | 7/2008 | Brickfield et al. | 700/291 |
| 2009/0157529 A1 | 6/2009 | Ehlers et al. | |
| 2009/0198384 A1 | 8/2009 | Ahn | |
| 2010/0088261 A1 * | 4/2010 | Montalvo | 706/15 |
| 2010/0106342 A1 * | 4/2010 | Ko et al. | 700/295 |
| 2010/0241285 A1 * | 9/2010 | Johnson et al. | 700/296 |
| 2011/0066300 A1 * | 3/2011 | Tyagi et al. | 700/291 |

* cited by examiner

*Primary Examiner* — Kavita Padmanabhan
*Assistant Examiner* — Patrick Cummins
(74) *Attorney, Agent, or Firm* — Sutherland Asbill & Brennan LLP

(57) ABSTRACT

Certain embodiments of the invention may include systems, methods, and apparatus for estimating demand response load change. According to an example embodiment of the invention, a method is provided for estimating energy usage change associated with a demand event. The method may include determining energy potential change during a demand event for one or more devices associated with a location; estimating energy usage patterns for the location over predefined time periods before and after the demand event; determining pre-demand event and post-demand event energy rebounds based at least in part on the estimated energy usage patterns; determining an energy change profile associated with the location based at least in part on the determined energy potential change, and the pre-demand event and post-demand event energy rebounds.

20 Claims, 3 Drawing Sheets

US 8,532,836 B2

DEMAND RESPONSE LOAD REDUCTION ESTIMATION

FIELD OF THE INVENTION

This invention generally relates to energy systems, and in particular, to systems, methods, and apparatus for demand response load reduction estimation.

BACKGROUND OF THE INVENTION

Power utilities need systems that can adjust energy output based on measured loads and/or estimated load forecasts. For example, if an estimated load forecast predicts that the energy usage for a certain period may be above a critical peak load, the utilities may need to manipulate energy usage to avoid such peak load conditions.

BRIEF SUMMARY OF THE INVENTION

Some or all of the above needs may be addressed by certain embodiments of the invention. Certain embodiments of the invention may include systems, methods, and apparatus for demand response load reduction estimation.

According to an example embodiment of the invention, a method for estimating energy usage change associated with a demand event is provided. The method can include determining energy potential change during a demand event for one or more devices associated with a location; estimating energy usage patterns for the location over predefined time periods before and after the demand event; determining pre-demand event and post-demand event energy rebounds based at least in part on the estimated energy usage patterns; and determining an energy change profile associated with the location based at least in part on the determined energy potential change, and the pre-demand event and post-demand event energy rebounds. The method may include outputting the determined energy change profile.

According to another example embodiment, a system is provided for estimating energy usage change associated with a demand event. The system can include one or more advanced metering infrastructure (AMI) communications networks; at least one memory for storing data and computer-executable instructions; one or more databases; and at least one processor configured to access the at least one memory, the one or more databases, and the one or more AMI communication networks. The at least one processor is further configured to execute the computer-executable instructions for determining energy potential change during a demand event for one or more devices associated with a location, estimating energy usage patterns for the location over predefined time periods before and after the demand event, determining pre-demand event and post-demand event energy rebounds based at least in part on the estimated energy usage patterns, determining an energy change profile associated with the location based at least in part on the determined energy potential change, and the pre-demand event and post-demand event energy rebounds, and outputting the determined energy change profile.

According to another example embodiment, an apparatus is provided for estimating energy usage change associated with a demand event. The apparatus may include at least one memory for storing data and computer-executable instructions. The apparatus may also include at least one processor configured to access the at least one memory, and further configured to execute the computer-executable instructions for determining energy potential change during a demand event for one or more devices associated with a location, estimating energy usage patterns for the location over predefined time periods before and after the demand event, determining pre-demand event and post-demand event energy rebounds based at least in part on the estimated energy usage patterns, determining an energy change profile associated with the location based at least in part on the determined energy potential change, and the pre-demand event and post-demand event energy rebounds, and outputting the determined energy change profile.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
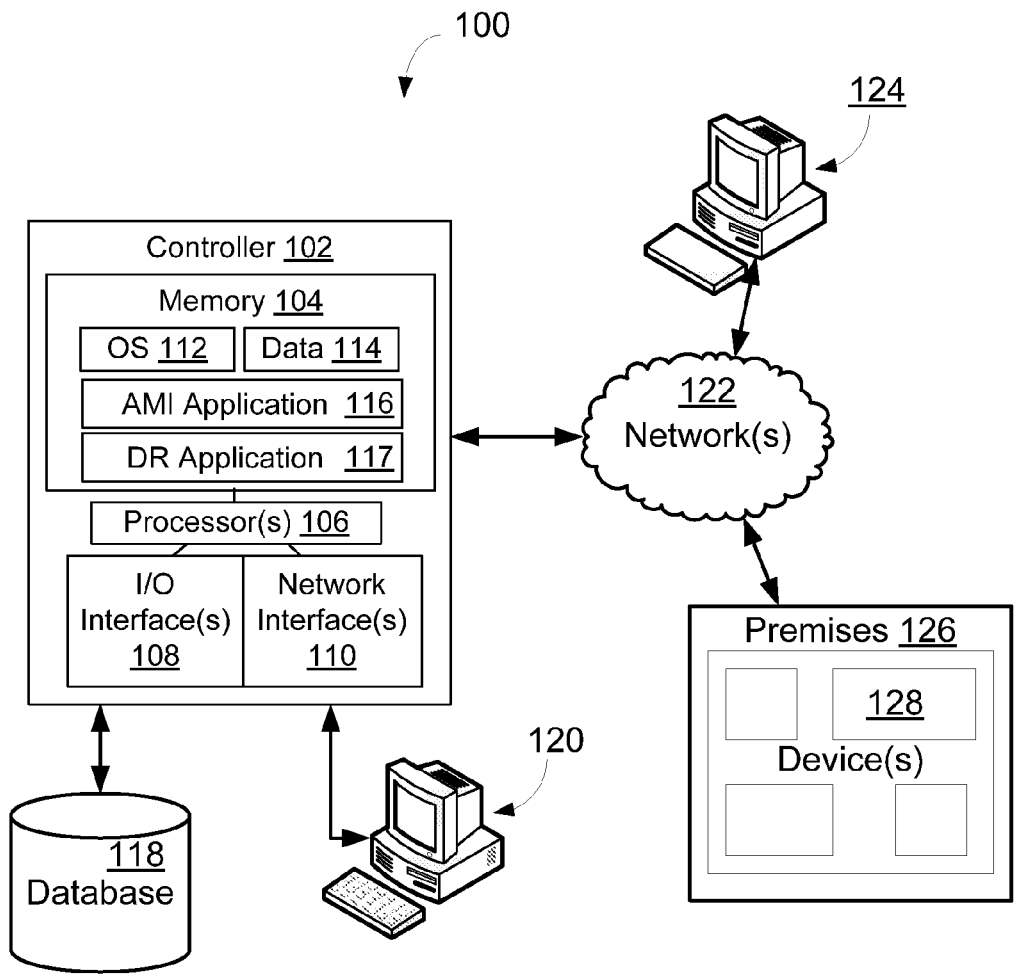
FIG. 1 is a block diagram of an illustrative demand response system, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

According to an example embodiment of the invention, a demand response system may be utilized to reduce or manage peak load conditions. For example, a power utility may utilize demand events to manipulate energy usage. In an example embodiment, a demand event may be initiated by a utility, and may include sending a signal or schedule to a device to reduce energy consumption. In an example embodiment, direct load control (DLC) demand events may be utilized to reduce the energy usage by directly sending signals to programmable thermostats, external water heaters, and other non-critical loads. According to another example embodiment of the invention, critical peak pricing (CPP) demand events may be utilized to reduce usage indirectly by sending pricing signals or information to consumers. In an example embodiment, CPP pricing signals may reduce the energy usage as the consumer is aware of heightened prices during a given period. In another example embodiment, CPP pricing signals may help offset the cost of power generation and distribution during the peak load conditions.

In accordance with certain example embodiments, a consumer may subscribe to a fixed set of direct load control or critical peak pricing events for a period. In an example embodiment, a power utility may provide economic incentives for the end consumers to subscribe in such load control programs to encourage subscriptions. In certain embodiments, the power utility may be obligated to not exceed a maximum number of subscribed events or the committed number of hours of events.

According to an example embodiment, end consumers may choose to override the demand event if they do not want to run such an event at a given time. In an example embodiment of the invention, the demand response systems may keep track of overrides, partially run events, and/or overridden counts.

In an example embodiment of the invention, one or more modeling algorithms may be utilized to calculate the amount of energy savings available per demand event. For example, the amount of energy savings may be based upon the type of the event, the characteristics of the premises, or other related factors. According to example embodiments, events may be distributed, timed, or scheduled so that a maximum number of available events may be consumed while achieving maximum critical peak reduction possible. In certain example embodiments, events may be evenly distributed in time and/or geographic region.

According to example embodiments, demand events may be represented graphically or conceptually by a "fuel tank." In an example embodiment, the "fuel tank" may represent an aggregation of predicted energy usage reduction available to power utilities. In an example embodiment, demand response estimation may utilize an algorithm that calculates the energy usage reduction based upon the subscription events remaining in the "fuel tank". In an example embodiment, the reduction associated with each remaining demand event may depend upon type of the household, the type of the events remaining, and other factors.

According to example embodiments, the demand response load reduction estimation system may make use of subscribed demand events. For example, if all the subscribed events are not utilized, then power utility may lose an opportunity to reduce the peak load conditions, and subsequently may lose the opportunity to reduce the cost of energy generation and/or distribution. On the other hand, if all the demand events are utilized on relatively insignificant forecasted peaks, then power utilities may have to bear peak pricing cost for other significant peak load conditions. In an example embodiment, the "fuel tank" concept may enable power utilities to manage fluctuations and costs associated with the varying supply and demand of energy.

In an example embodiment, energy usage reduction available may be predicted based upon available historical data. For example, an indicator of overall energy usage reduction may be determined by amount of the demand event time that is remaining. According to an example embodiment, the number of demand events, time per demand event, and/or power usage per demand event may be utilized to determine the overall demand event time and/or energy remaining in the "fuel tank." According to an example embodiment, the time and/or energy remaining may allow the power utility to make informed decisions and more effectively manage the energy supply and demand.

According to example embodiments of the invention, various modules, processes, communication systems, and data storage devices may be utilized for determining demand and manipulating the response and will now be described with reference to the accompanying figures.

FIG. 1 illustrates an example demand response system 100, according to and example embodiment of the invention. For example, the system 100 may include a controller 102. The controller may include a memory 104, one or more processors 106, one or more input/output interfaces 108, and one or more network interfaces 110. In an example embodiment, the memory 104 may include an operating system 112, data 114, an advanced metering infrastructure (AMI) application 116, and a demand response (DR) application 117.

According to an example embodiment, the demand response system 100 may also include a database 118 in communication with the controller 102. In an example embodiment, the demand response system 100 may also include one or more networks 122, one or more local displays or alert processors 120, and one or more remote systems or displays 124. According to an example embodiment, the demand response system 100 may communicate with devices 128 at a customer premises 126 via the one or more networks 122. In certain example embodiments, the devices 128 may be AMI devices.

Figure 2:
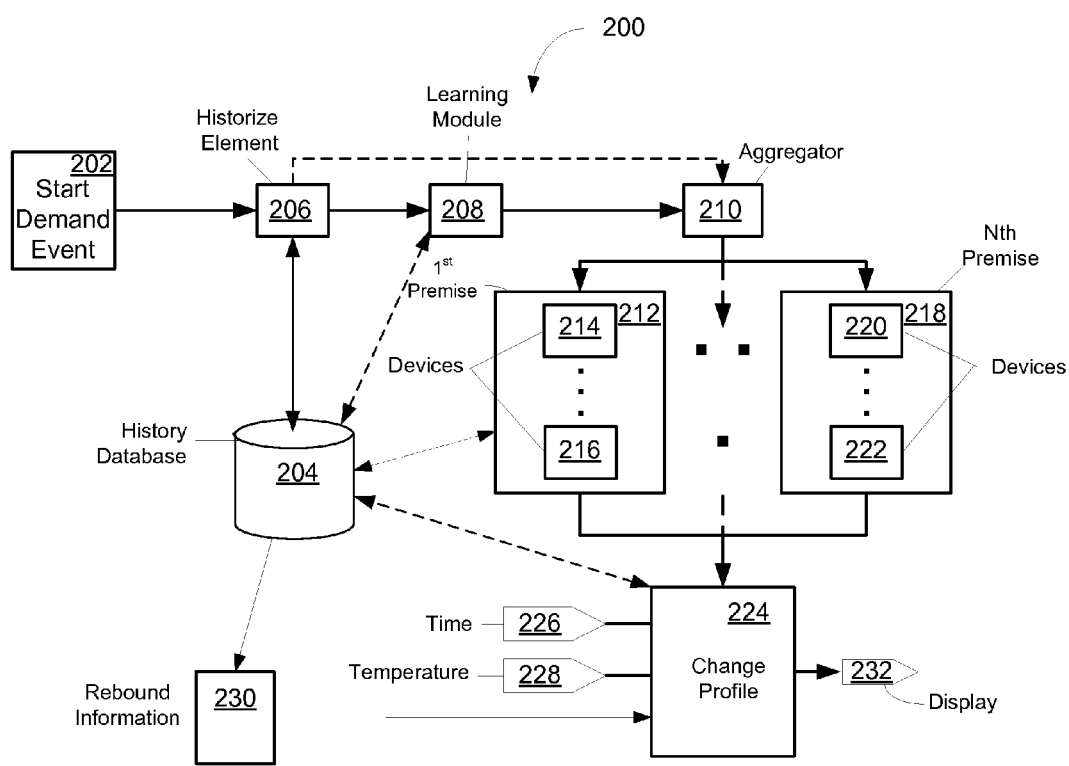
FIG. 2 is a block diagram of an illustrative demand response process, according to an example embodiment of the invention.

FIG. 2 depicts a demand response process 200, according to an example embodiment. In an example embodiment, the demand response process 200 may begin with a start demand event 202. For example, the start demand event 202 may be a command generated by an AMI application module (as in 116 in FIG. 1) or by the demand response application module (as in 117 in FIG. 1). According to an example embodiment, information such as meter load, group load, premises temperatures, load level profiles, and available historical data may be obtained from a history database 204. Such information, for example, may be utilized in the process 200 for preparing appropriate demand events, learning biases, controlling demand response requests, and estimating available demand events. In an example embodiment, a historize element 206 may request, receive, and process information from the history database 204. According to an example embodiment, a historical data learning module 208 may be utilized to determine any biases associated with the information received from the historize element 206. In an example embodiment, the historical data learning module 208 may utilize artificial intelligence and/or neural networks to determine, adjust, and or refine biases based on the historical data. According to an example embodiment, the historical data learning module 208 may communicate directly with the history database 204, and/or it may receive information from the historize element 206.

In an example embodiment, the demand response process 200 may include an aggregator 210 that may receive data from the historize module 206 and/or the learning module 208. According to an example embodiment, the aggregator 210 may be utilized to adjust premise biases based on group level reduction information. Example calculations utilized by the aggregator 210 will be further discussed in the "Demand Event—Response Estimation Calculations" section below.

According to an example embodiment of the invention, the aggregator 210 may be used to update or adjust biases, and may provide information and/or control signals for the (automated metering infrastructure) devices 214-216 associated with a first premise 212 through devices 220-222 associated with the Nth premise 218. In an example embodiment, the biases may include pre-rebound biases, post-rebound biases, and device biases. In an example embodiment, the devices associated with a premise may read and/or write to a look-up table to access and/or update additional information such as device baseline load reduction, time, and/or temperature. In an example embodiment, a lookup table may be communicated to the devices or updated via the aggregator 210.

According to an example embodiment, the devices 214-216, 220-222 may be configured to provide feedback to the demand response process 200. For example, when a device is turned on, overridden, turned off, etc., such information may be recorded in the history database 204. According to certain example embodiments, the feedback from the devices may be utilized to calculate a change profile 224. In an example embodiment, time N 226 and the temperature at time N 228 may provide input for calculating the change profile 224. According to example embodiments of the invention, the pre- and post-rebound 230 information may also be utilized to calculate the reduction change profile 234. According to an example embodiment, the results of the reduction change profile 224 may be output for display 232 or used to control additional processes associated with the demand response.

Demand Event—Response Estimation Calculations

According to example embodiments of the invention, demand event response estimate calculations may be determined. For example, in a given time period, the energy reduction for a given premise may be predicted by a response estimator. In an example embodiment, and based upon the number of smart devices associated with a given premise, the premise energy reduction may be calculated using following equations:

$$\text{Energy\_reduction}_p = \sum_{d=0}^{n} \text{Bias}_d * \text{response\_estimate}_d(\text{time, temp});$$

$$\text{prerebound}_p = \text{prerebound\_bias}_p * \text{Energy\_reduction}_p;$$

$$\text{postrebound}_p = \text{postrebound\_bias}_p * \text{Energy\_reduction}_p;$$

$$\text{ER\_profile}_{p(time,temp)} =$$
$$\text{Energy\_reduction}_{p(time,temp)} + \text{prerebound}_p + \text{postrebound}_p;$$

where response_estimate$_d$(time,temp)=device response estimate for a given time and temperature;

Bias$_d$=device bias for the Nth device;

prerebound$_p$=pre-event energy rebound value for premise p;

postrebound$_p$=post-event energy rebound value for premise p;

prerebound_bias$_p$=pre-event bias for premise p;

postrebound_bias$_p$=post-event bias for premise p; and

ER_profile$_{p(time,temp)}$=energy reduction for premise p for a given temperature and time.

Demand Event—Response Estimation Calculations

According to example embodiments of the invention, demand event fuel tank calculations may be determined. For example, demand response consumers may subscribe to a fixed number of demand events of a certain type. In an example embodiment, the fuel tank may represent the possible energy reduction available to the utility at any given point in time. For example, if none of the events are used, then the fuel tank is 100% full; but if all are used up, the fuel tank is 0% full. According to certain example embodiments, the fuel tank representation can be shown at any level of grouping of the consumers. In an example embodiment, the hierarchical representation of the groups and subgroups within the demand response system may allow fuel tank representation at any grouping level. In an example embodiment, and based upon the number of smart devices associated with a given premise, the fuel tank level may be determined by the following equations:

$$\text{remaining\_time}_p = \text{remaining\_events}_p * \text{Max\_demand\_even\_time}_p;$$

$$\text{remaining\_energy}_g = \sum_{p=0}^{n} \text{ER\_profile}_{p(remaining\_time_p, temp)};$$

$$\text{total\_energy}_g = \sum_{p=0}^{n} \text{ER\_profile}_{p(total\_time_p, temp)};$$

$$\text{Fuel\_Tank}_g = \frac{\text{remaining\_energy}_g}{\text{total\_energy}_g}.$$

Figure 3:
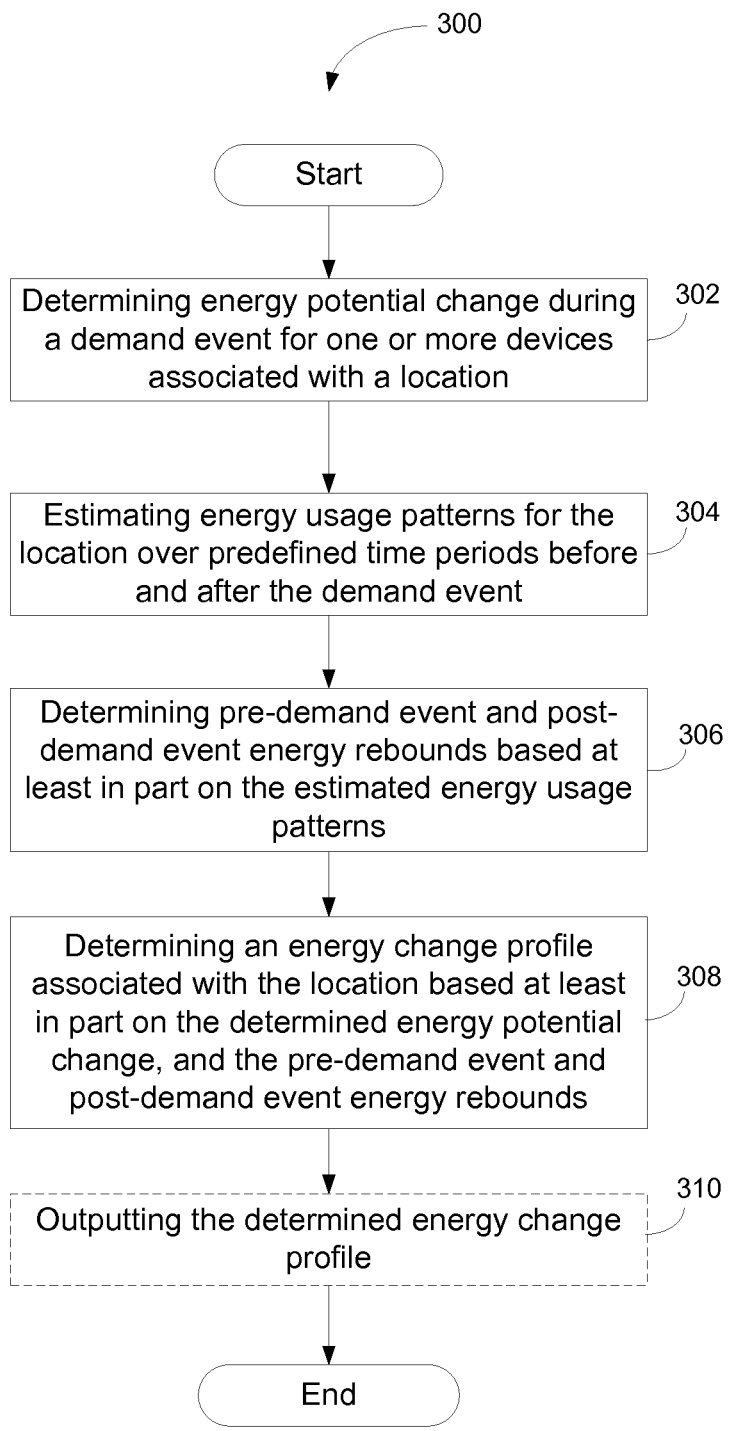
FIG. 3 is a flow diagram of an example method according to an example embodiment of the invention.

An example method 300 for estimating energy usage change associated with a demand event will now be described with reference to the flowchart of FIG. 3. According to an example embodiment, the method 300 starts in block 302, and includes determining energy potential change during a demand event for one or more devices associated with a location. In block 304, method 300 includes estimating energy usage patterns for the location over predefined time periods before and after the demand event. In block 306, method 300 includes determining pre-demand event and post-demand event energy rebounds based at least in part on the estimated energy usage patterns. In block 308, method 300 includes determining an energy change profile associated with the location based at least in part on the determined energy potential change, and the pre-demand event and post-demand event energy rebounds. According to an example embodiment, the method 300 may include the optional block of outputting the determined energy change profile. The method 300 ends after block 310.

According to an example embodiment, the energy potential change may be determined by estimating energy consumption of a device over a predefined time period based at least in part on one or more of historical usage data, temperature, or artificial intelligence based at least in part on the historical usage data. According to an example embodiment, estimating energy usage patterns is based at least in part on historical usage data or artificial intelligence based at least in part on the historical usage data. According to an example embodiment, energy potential change may be determined for a group including one or more locations based at least in part on the determined energy change profile over a predefined available time period and a temperature for the one or more premises. In an example embodiment, the predefined available time period includes a product of a maximum demand event time and a number of remaining demand events for a location. In an example embodiment a percentage of remaining energy change available for the group may be determined based at least in part on the determined energy potential change for the group and a total energy change for the group, where the total energy change comprises a sum of all determined energy change profiles in the group over predefined total time periods and temperatures. In an example embodiment, the predefined total time periods include products of maximum demand event times and a number of total demand events for the one or more locations. In an example embodiment, the determined percentage of remaining energy change available for the group may be output for graphical or numeric display.

Accordingly, example embodiments of the invention can provide the technical effects of creating certain systems, methods, and apparatus that can enable utilities to manage energy peak demand and response. Example embodiments of the invention can provide the further technical effects of providing systems, methods, and apparatus for indicating the amount of demand event reduction available at a given time, and for a selected group of devices.

In example embodiments of the invention, the demand response system 100 and the demand response process 200 may include any number of hardware and/or software applications that are executed to facilitate any of the operations.

In example embodiments, one or more I/O interfaces may facilitate communication between the demand response system 100 and the demand response process 200, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the demand response system 100 and the demand response process 200. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the demand response system 100 and the demand response process 200 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget L M Ericsson) enabled network, a Wi-Fi™ (owned by Wi-Fi Alliance) enabled network, a satellite-based network any wired network, any wireless network, etc., for communication with external devices and/or systems.

As desired, embodiments of the invention may include the demand response system 100 and the demand response process 200 with more or less of the components illustrated in FIGS. 1 and 2.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for estimating energy usage change associated with a demand event, comprising:

receiving, with a processor, a plurality of demand events associated with a location;

determining, with the processor, energy potential change during a respective demand event, from the plurality of demand events, for one or more devices associated with the location;

determining, with the processor, a number of remaining demand events, of the plurality of demand events, associated with the location;

predicting energy usage patterns, with the processor, over predefined time periods before the respective demand event and resulting from the respective demand event, for the location, wherein the predefined time periods are determined based at least in part on the number of remaining demand events associated with the location;

determining, with the processor, pre-demand event and post-demand event energy rebounds based at least in part on the estimated energy usage patterns; and determining, with the processor, an energy change profile associated with the location based at least in part on the determined energy potential change, and the pre-demand event and post-demand event energy rebounds.

2. The method of claim 1, wherein determining energy potential change comprises estimating energy consumption of a device over a predefined time period based at least in part on one or more of historical usage data, temperature, or artificial intelligence based at least in part on the historical usage data.

3. The method of claim 1, wherein predicting energy usage patterns is based at least in part on historical usage data or artificial intelligence based at least in part on the historical usage data.

4. The method of claim 1, further comprising determining energy potential change for a group comprising one or more locations based at least in part on the determined energy change profile over a predefined available time period and a temperature for the one or more premises.

5. The method of claim 4, wherein the predefined available time period comprises a product of a maximum demand event time and the number of remaining demand events associated with the location.

6. The method of claim 4, further comprising determining a percentage of remaining energy change available for the group based at least in part on the determined energy potential change for the group and a total energy change for the group, wherein the total energy change comprises a sum of all determined energy change profiles in the group over predefined total time periods and temperatures, wherein the predefined total time periods comprising products of maximum demand event times and a number of total demand events for the one or more locations.

7. The method of claim 6, further comprising outputting the determined energy change profile or determined percentage of remaining energy change available for the group for graphical or numeric display.

8. A system for estimating energy usage change associated with a demand event, comprising:
one or more advanced metering infrastructure (AMI) communications networks;
at least one memory for storing data and computer-executable instructions;
one or more databases and
at least one processor configured to access the at least one memory, the one or more databases, and the one or more AMI communication networks, and further configured to execute the computer-executable instructions for:
receiving a plurality of demand events associated with a location;
determining energy potential change during a respective demand event, from the plurality of demand events, for one or more devices associated with the location;
determining a number of remaining demand events, of the plurality of demand events, associated with the location;
predicting energy usage patterns, over predefined time periods before the respective demand event and resulting from the respective demand event, for the location; wherein the predefined time periods are determined based at least in part on the number of remaining demand events associated with the location;
determining pre-demand event and post-demand event energy rebounds based at least in part on the estimated energy usage patterns; and
determining an energy change profile associated with the location based at least in part on the determined energy potential change, and the pre-demand event and post-demand event energy rebounds.

9. The system of claim 8, wherein determining energy potential change comprises estimating energy consumption of a device over a predefined time period based at least in part on one or more of historical usage data, temperature, or artificial intelligence based at least in part on the historical usage data.

10. The system of claim 8, wherein predicting energy usage patterns is based at least in part on historical usage data or artificial intelligence based at least in part on the historical usage data.

11. The system of claim 8, wherein the at least one processor is further configured for determining energy potential change for a group comprising one or more locations based at least in part on the determined energy change profile over a predefined available time period and a temperature for the one or more premises.

12. The system of claim 11, wherein the predefined available time period comprises a product of a maximum demand event time and the number of remaining demand events associated with the location.

13. The system of claim 11, wherein the at least one processor is further configured for determining a percentage of remaining energy change available for the group based at least in part on the determined energy potential change for the group and a total energy change for the group, wherein the total energy change comprises a sum of all determined energy change profiles in the group over predefined total time periods and temperatures, wherein the predefined total time periods comprising products of maximum demand event times and a number of total demand events for the one or more locations.

14. The system of claim 13, wherein the at least one processor is further configured for outputting the determined energy change profile or determined percentage of remaining energy change available for the group for graphical or numeric display.

15. An apparatus for estimating energy usage change associated with a demand event, comprising:
at least one memory for storing data and computer-executable instructions;
at least one processor configured to access the at least one memory, and further configured to execute the computer-executable instructions for:
receiving a plurality of demand events associated with a location;
determining energy potential change during a respective demand event, from the plurality of demand events, for one or more devices associated with the location;
determining a number of remaining demand events s, of the plurality of demand events, associated with the location;
predicting energy usage patterns, over predefined time periods before the respective demand event and resulting from the respective demand event, for the location, wherein the predefined time periods are determined based at least in part on the number of remaining demand events associated with the location;
determining pre-demand event and post-demand event energy rebounds based at least in part on the estimated energy usage patterns; and determining an energy change profile associated with the location based at least in part on the determined energy potential change, and the pre-demand event and post-demand event energy rebounds.

16. The apparatus of claim 15, wherein determining energy potential change comprises estimating energy consumption of a device over a predefined time period based at least in part on one or more of historical usage data, temperature, or artificial intelligence based at least in part on the historical usage data.

17. The apparatus of claim 15, wherein predicting energy usage patterns is based at least in part on historical usage data or artificial intelligence based at least in part on the historical usage data.

18. The apparatus of claim 15, wherein the at least one processor is further configured for determining energy potential change for a group comprising one or more locations based at least in part on the determined energy change profile over a predefined available time period and a temperature for the one or more locations, wherein the predefined available time period comprises a product of a maximum demand event time and a number of remaining demand events for a location.

19. The apparatus of claim 18, wherein the at least one processor is further configured for determining a percentage of remaining energy change available for the group based at least in part on the determined energy potential change for the group and a total energy change for the group, wherein the total energy change comprises a sum of all determined energy change profiles in the group over predefined total time periods and temperatures, wherein the predefined total time periods comprising products of maximum demand event times and a number of total demand events for the one or more locations.

20. The apparatus of claim 19, wherein the at least one processor is further configured for outputting the determined energy change profile or determined percentage of remaining energy change available for the group for graphical or numeric display.

* * * * *